(12) United States Patent
Godtland et al.

(10) Patent No.: US 7,460,762 B2
(45) Date of Patent: *Dec. 2, 2008

(54) AUTOMATIC SELECTION, RECORDING AND MEANINGFUL LABELING OF CLIPPED TRACKS FROM BROADCAST MEDIA WITHOUT AN ADVANCE SCHEDULE

(76) Inventors: Eric J. Godtland, 1108 Cole St., San Francisco, CA (US) 94107; Dustin D. Sorenson, 1711 Stoner Ave., #11, Los Angeles, CA (US) 90025

( * ) Notice: Subject to any disclaimer, the term of this patent is extended or adjusted under 35 U.S.C. 154(b) by 940 days.

This patent is subject to a terminal disclaimer.

(21) Appl. No.: 10/824,727

(22) Filed: Apr. 14, 2004

(65) Prior Publication Data

US 2005/0232576 A1 Oct. 20, 2005

(51) Int. Cl.
*H04N 7/26* (2006.01)
*G06F 3/00* (2006.01)

(52) U.S. Cl. .............................. 386/52; 386/46; 386/95; 725/47; 725/55; 725/58; 725/61

(58) Field of Classification Search ................... 386/46, 386/52, 69, 83, 95, 111, 112, 124–126; 455/132, 455/230; 725/38, 39, 46, 47, 55, 58, 61, 725/153
See application file for complete search history.

(56) References Cited

U.S. PATENT DOCUMENTS

| | | | |
|---|---|---|---|
| 5,418,622 A | 5/1995 | Takeuchi .................... 358/335 |
| 5,721,827 A | 2/1998 | Logan et al. ........... 395/200.47 |
| 5,726,909 A | 3/1998 | Krikorian ............... 364/514 R |
| 5,732,216 A | 3/1998 | Logan et al. ........... 395/200.33 |
| 5,892,536 A | 4/1999 | Logan et al. ................... 348/13 |
| 5,918,223 A | 6/1999 | Blum et al. ..................... 707/1 |
| 5,986,692 A | 11/1999 | Logan et al. .................. 348/13 |
| 6,088,455 A | 7/2000 | Logan et al. ................. 380/200 |
| RE36,801 E | 8/2000 | Logan et al. ................. 348/571 |
| 6,199,076 B1 | 3/2001 | Logan et al. ................. 707/501 |
| 6,282,209 B1 | 8/2001 | Kataoka et al. ............. 370/498 |
| 6,317,882 B1 | 11/2001 | Robbins ....................... 725/34 |
| 6,320,623 B1 | 11/2001 | Cavallerano et al. ........ 348/553 |

(Continued)

OTHER PUBLICATIONS http://www.gotuit.com/audio/agradio.html downloaded Apr. 7, 2004 "Gotuit Audio" 3 pages.

(Continued)

*Primary Examiner*—Thai Tran
*Assistant Examiner*—Mishawn Dunn
(74) *Attorney, Agent, or Firm*—Lumen Patent Firm

(57) ABSTRACT

Automatic selection, recording and meaningful labeling of tracks from broadcast media streams is provided. Content information which relates to tracks currently being played and/or to previously played tracks is used to guide selection of tracks to be recorded and to provide meaningful labels for recorded tracks. This content information does not provide an advance schedule of tracks to be played in the future. A segment is temporarily recorded from a selected media stream. The content information relating to tracks in the segment is compared with previous user input (i.e., track preferences) to select tracks within the segment to be recorded. For each selected track, clipping is performed to identify track start and end times. Clipped tracks are recorded onto a suitable long-term recording medium, and labeled with a meaningful label derived from the content information.

28 Claims, 4 Drawing Sheets

U.S. PATENT DOCUMENTS

| | | | |
|---|---|---|---|
| 6,407,750 B1 | 6/2002 | Gioscia et al. | 345/716 |
| 6,504,990 B1* | 1/2003 | Abecassis | 386/46 |
| 7,292,774 B1* | 11/2007 | Masters et al. | 386/83 |
| 2003/0031248 A1 | 2/2003 | Yurt et al. | 375/240.01 |
| 2003/0167174 A1 | 9/2003 | Dagtas et al. | 704/275 |
| 2003/0219229 A1 | 11/2003 | Gauba et al. | 386/83 |
| 2004/0116088 A1* | 6/2004 | Ellis et al. | 455/132 |
| 2004/0225519 A1* | 11/2004 | Martin | 705/1 |

OTHER PUBLICATIONS http://www.replay-radio.com/?src=GREC_RECRAD6 downloaded Apr. 7, 2004 "Replay Radio 4.1" Replay Radio—Internet Radio Recorder 14 pages.

http://www.neurosaudio.com/ downloaded Apr. 7, 2004 "Neuros" 8 pages.

http://www.pogoproducts.com/products_2.html downloaded Apr. 7, 2004 "Pogo Products" 3 pages.

http://www.wired.com/news/technology/0,1282,58769,00.html downloaded Apr. 7, 2004 "Wired News: A TiVo Player for the Radio" 3 pages.

Lisa Morgan et al., "Coming: Set-Top Box Recording," IEEE Spectrum, Feb. 2002, pp. 18-21.

Yeong Kyeong Seong et al., "Design and Implementation of Hard Disk Drive Embeded Digital Satellite Receiver With File Management" IEEE Transactions on Consumer Electronics, vol. 48, No. 1, Feb. 2002, pp. 125-130.

* cited by examiner

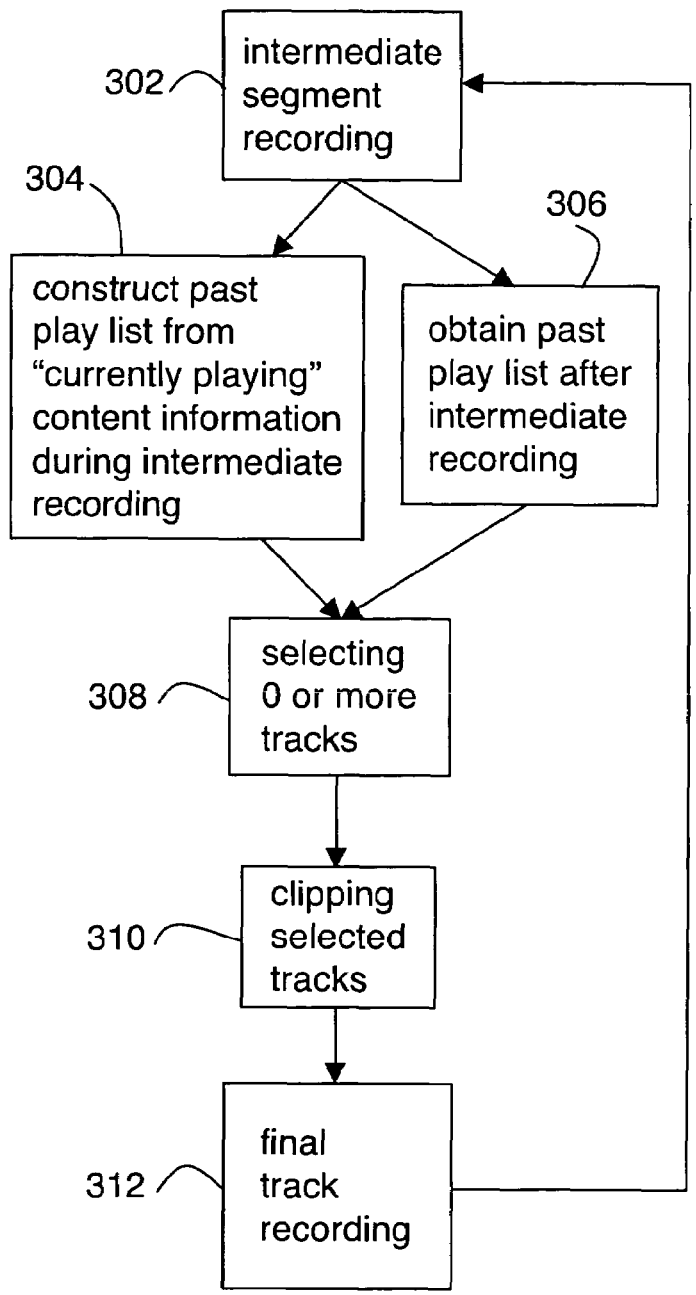
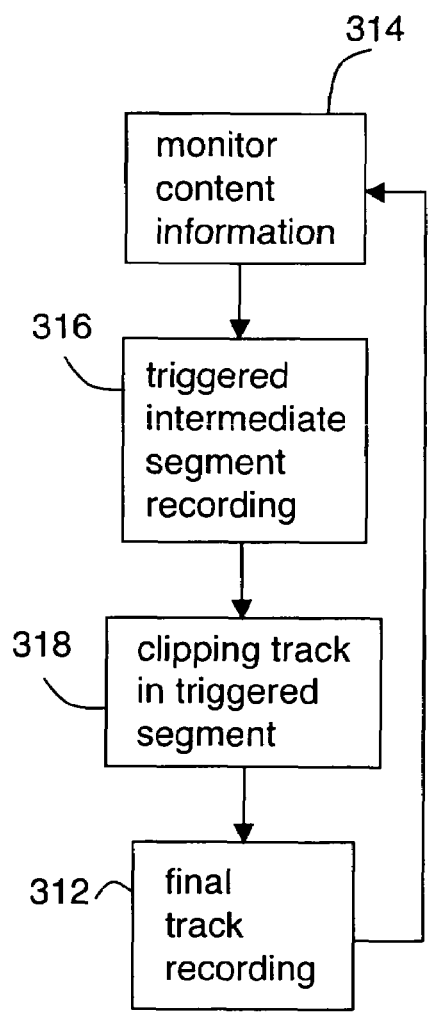
Fig. 3a
Fig. 3b

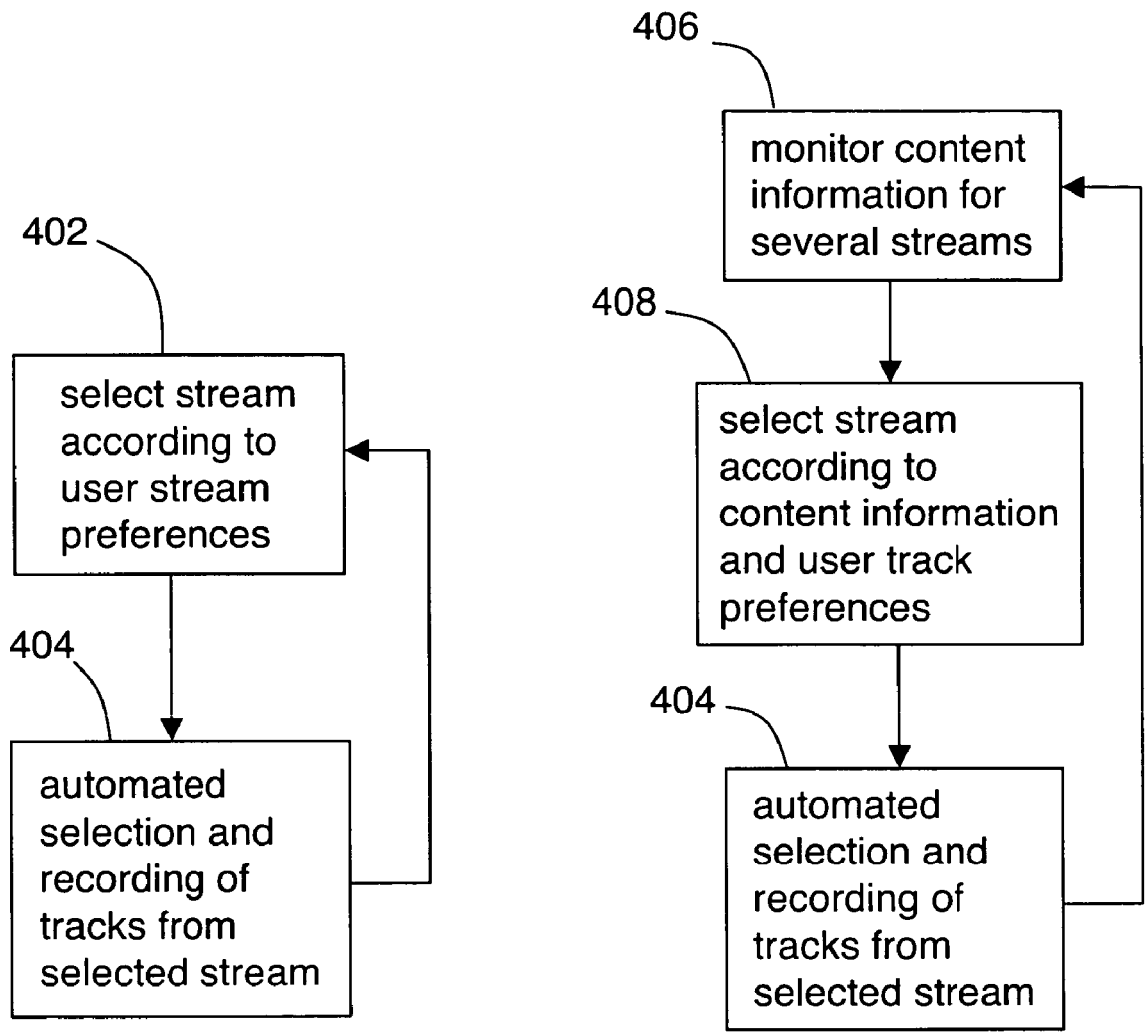
Fig. 4a                    Fig. 4b

AUTOMATIC SELECTION, RECORDING AND MEANINGFUL LABELING OF CLIPPED TRACKS FROM BROADCAST MEDIA WITHOUT AN ADVANCE SCHEDULE

FIELD OF THE INVENTION

This invention relates to recording of broadcast media.

BACKGROUND

In recent years, high-quality broadcast media (e.g., digital radio and digital television) and high-capacity, high-fidelity personal recording capability have become widely available. For example, a 100 GB magnetic disk drive can store high-fidelity recordings of roughly 15,000 to 50,000 music tracks, depending on resolution, and high-quality broadcast of such music tracks is becoming increasingly commonplace. As a result, the principal difficulties to be overcome in generating a library of recorded broadcasts for personal use are issues associated with creating, organizing and managing such a library. For example, if user input is required for each track (for recording, labeling and/or organizing), then generation of a large library of recorded tracks will be excessively time-consuming.

Automated selection and recording of broadcast media has been considered in the art, especially in connection with the TiVo® service offered by TiVo Inc. However, this service relies on advance schedule information and/or on special tags inserted into broadcast media streams in order to perform automatic selection and recording. For example, the system provided by TiVo Inc. typically provides advance schedule information to a user, and the user is then able to select shows for recording based on the advance schedule information. Such user selection can be manual (e.g., the user selects a particular show on a particular day for recording or triggers a recording button for immediate recording). The user selection can also be automatic (e.g., the user selects a particular type of show to be recorded, and the system automatically records all such shows found in the advance schedule when they are broadcast).

However, advance schedule information may not always be available, especially in broadcast radio. For example, an advance schedule for tracks played during a live radio call-in show is inherently impossible to provide. Moreover, some radio broadcasters are prohibited from providing an advance schedule of their programming content by current US copyright law. Furthermore, a timing discrepancy between advance schedule time and actual broadcast time is to be expected, and this discrepancy can be as much as a minute or so in current systems. Such a timing error is typically not a serious issue when recording television shows which are usually at least half an hour long, and are typically separated by lengthy commercial breaks. However, a timing error of that magnitude is unacceptable for recording music tracks which frequently have a total duration on the order of a few minutes, and are often played without intervening commercials. An advance schedule suitable for use in recording music in a hypothetical system similar to that of TiVo Inc. may be required to have a timing error of about a second or even less, which greatly increases the difficulty of providing such an advance schedule-based service.

Accordingly, it would be an advance in the art to provide automated selection and recording of broadcast media which does not require advance schedule information. It would be a further advance in the art to provide automated selection and recording of broadcast media that compensates for timing errors in content information used to make selections. It would be a further advance in the art to automatically provide meaningful labels for automatically recorded tracks.

SUMMARY

The present invention provides systems and methods for automatic selection, recording, and meaningful labeling of tracks from broadcast media streams. Content information which relates to tracks currently being played and/or to previously played tracks is used to guide selection of tracks to be recorded and to provide meaningful labels for recorded tracks. This content information does not provide an advance schedule of tracks to be played in the future. A segment is intermediate recorded from a selected media stream. The content information relating to tracks in the segment is compared with previous user input (i.e., track preferences) to select tracks within the segment to be long-term recorded. For each selected track, start and end times are determined and the track is clipped accordingly to accurately define the track. Clipped tracks are final recorded onto a suitable long-term recording medium, and labeled with a meaningful label derived from the content information. Optionally, the recorded tracks can be automatically organized according to their respective meaningful labels.

BRIEF DESCRIPTION OF THE DRAWINGS

FIGS. 3a and 3b show methods for batch and triggered recording, respectively, according to embodiments of the invention.

FIGS. 4a and 4b show methods for static and dynamic stream selection, respectively, according to embodiments of the invention.

DETAILED DESCRIPTION

Figure 1:
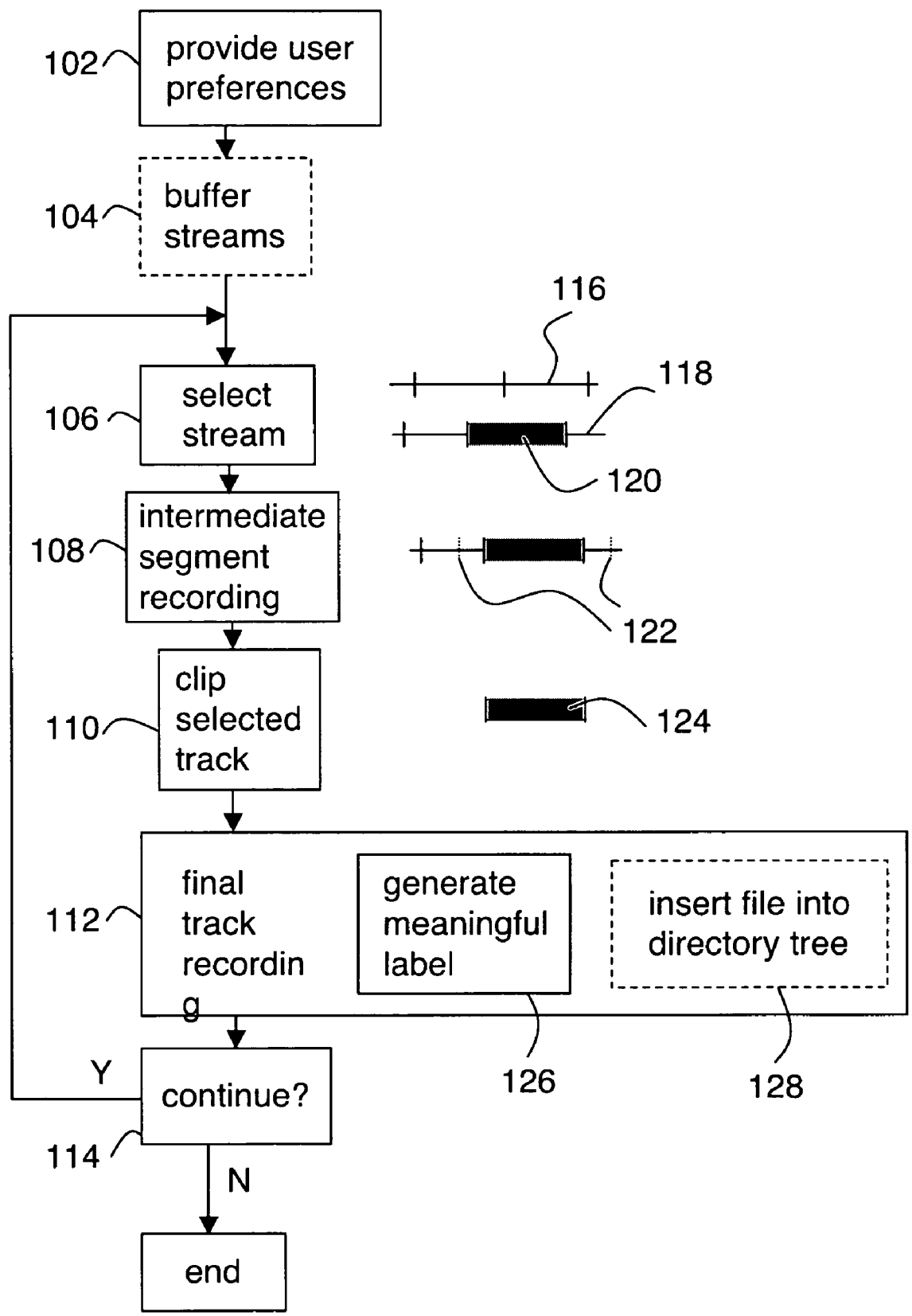
FIG. 1 is a flow diagram of an automated selection and recording method according to an embodiment of the invention.

FIG. 1 is a flow diagram of an automated selection and recording method according to an embodiment of the invention. In the example of FIG. 1, it is assumed that several broadcast media streams are available for recording, and that content information specifying the tracks currently playing on each media stream is available. Other embodiments of the invention, discussed in connection with FIG. 3a, can make use of content information relating to previously played tracks.

Throughout this description, content information can include information such as track title and/or track artist and/or track album etc. Content information can be made available either by a broadcaster or by a third party. Furthermore, content information may relate to tracks that are currently playing on broadcast media streams, or can relate to tracks that have been previously played on broadcast media streams. Content information can also be augmented with user or third-party stream descriptions. For example, a user or a third party may designate station X as "70s rock" and this designation can be included in content information for tracks recorded from station X. As used herein, content information does not include schedule information on tracks to be played in the future.

The first step of this method is to provide user preferences 102. User preferences 102 include track preferences, such as preferred artists, album titles and/or track titles. Such track preferences are used to automatically select tracks for recording in accordance with the invention. Optionally, the method can derive track preferences from user input and/or past history. For example, a list can be maintained of all tracks that have been recorded to date, and such a list allows recording of duplicates to be automatically avoided. In such cases, a user can select whether or not to prevent duplicate recording.

User preferences 102 can optionally include stream preferences, such as a station to monitor, a fixed monitoring schedule including several stations monitored at different times, and/or a monitoring schedule having at least two stations monitored simultaneously (which requires a multichannel recording system). Alternatively, stream (or channel) selection can be based on track preferences and content information. For example, a user directive to "record anything by artist X broadcast on any channel" can be used to govern stream selection. Of course, such a directive is typically not absolute, and results will depend on stream characteristics and on the performance of the system used to implement the method. For example, if two different songs by artist X are simultaneously playing on two different streams, then a single-channel system will be able to record only one of the two songs. Stream selection can also be governed by user-supplied rules combined with historical data. For example, a user can supply a rule to de-select channels which have a high duplication rate of tracks already recorded. Conversely, a user can also supply a rule to select channels whose programming has many non-duplicate tracks of interest to the user.

The second step of the method of FIG. 1 is optional buffering 104. In this context, buffering a media stream entails receiving the media stream into a temporary storage device and outputting a buffered media stream from the temporary storage device. The buffered media stream is a faithful replica of the input media stream, except for a fixed time delay. Suitable temporary storage devices for providing such buffering of a media stream are known, and are especially easy to provide for digital media streams. In some cases, a stream may be selected after broadcast of a desired track has begun, and in such cases, buffering the media streams is preferred to enable recording of the entire desired track. This can be done by recording from the buffered media stream, and ensuring the buffer delay is longer than the delay between the start of the desired track and completion of stream selection. In some cases, the content information may be included in the same physical signal as one or more media streams, and in such cases, the incoming signal can be duplicated with one part being delayed by buffering and treated as the media stream, and the other part not being delayed and being treated as the content information. For the purposes of this description, buffering 104 provides relatively short time delays, and is preferably implemented as a RAM cache within chip-based memory.

The next step of the method of FIG. 1 is stream selection 106, as discussed above. In this example, two streams 116 and 118 are available, and a desired track 120 is identified on stream 118 based on content information and user track preferences. Thus stream 118 is selected.

The next step of the method of FIG. 1 is intermediate recording 108 of a segment of selected stream 118. Intermediate recording 108 can make use of any recording medium, such as RAM or a magnetic recording medium (e.g., a disk drive). In cases where recording 108 records to a non-volatile medium (e.g., magnetic or optical storage), the resulting recorded segment is called "intermediate" in this description (even though it is a non-volatile recording) because further processing will be performed on the recorded segment to arrive at the desired final track recordings. Segment start and end times 122 are shown on FIG. 1. Buffering as discussed above can be used to ensure the segment start time is before the start time of track 120. By monitoring the content information of stream 118, the start time of the track following track 120 on stream 118 (and thus the end time of track 120) is known. Segment recording preferably extends past this end time by a suitable time interval to ensure the segment includes all of track 120.

The next step of the method of FIG. 1 is clipping 110 of selected track 120 within the recorded segment. Clipping 110 entails automatically determining the start and end times of selected track 120. Such a determination can be made by known methods. For example, intervals of silence can be located in a segment of a media stream by a digital signal processor (DSP) (implemented in hardware and/or in software) to determine track start and end times. If background noise is present, then a DSP may use relative silence, rather than absolute silence as a guide to determine clipping points. If timing markers are available from the content information, these can be used to determine clipping points, either alone or in conjunction with the above DSP methods. Such timing markers can be provided as a real time stream relating to currently playing tracks, or as a log of start and end time of previously played tracks. Clipping 110 can be performed with a much greater degree of precision than can be expected from a system relying on advance schedule information for track start and end times, and this improved precision is a significant advantage of the invention.

The next step of the method of FIG. 1 is final recording 112 of clipped and selected track 120. Track 120 is recorded between the start and end times determined by clipping 110. Recording 112 entails generating a meaningful label 126 for the recorded track. Labels are referred to as "meaningful" only if they are derived from relevant content information. For example, a label "track00" is not a meaningful label of a recording of Beethoven's 9th symphony, while a label "Beethoven Symphony 9" is a meaningful label for such a track. Such labels can be file names, or such labeling can be implemented in an associated database relating file names to labels. For example, recorded tracks could have purely numerical file names, and a database relating numerical filenames to meaningful labels (e.g., artist, album title, song title, etc.) can be automatically constructed, maintained and updated. Optionally, recording 112 also includes organizing the recorded track according to its label (e.g., inserting the file into a directory tree 128). For example, a meaningfully labeled recording file can be inserted into a hierarchical directory structure organized by genre, artist and album title in increasing order of specificity. Final recording 112 can be to any recording medium, such as an optical recording medium, a magnetic recording medium, or a nonvolatile semiconductor memory medium. Preferably, final recording 112 is to a magnetic recording medium, such as a conventional computer hard disk drive.

Since genre information is often assumed to be obvious given the nature of the broadcast stream, genre information may be derived from user provided, third party provided or automatically generated genre descriptions for a given stream. This genre information can be combined with the content information to create a greater degree of labeling and/or organizing accuracy for each track. Such labeling and organization is largely independent of the physical nature of the recording medium. Automatic labeling of recorded tracks with meaningful content-based labels, as discussed above, is a significant advantage of the invention compared to automatic recording methods which only provide meaningless labels (e.g., numeric labels or date/time/station labels) that have no relevance to the track content. For example, an automatic recording system without automatic meaningful labeling of tracks can confront a user with a daunting and tedious task of manually labeling hundreds or even thousands of recorded tracks.

Finally, a decision 114 is made whether or not to continue monitoring and recording. If "yes", the method flow returns to a point before step 106. If "no", the method flow terminates.

Figure 2:
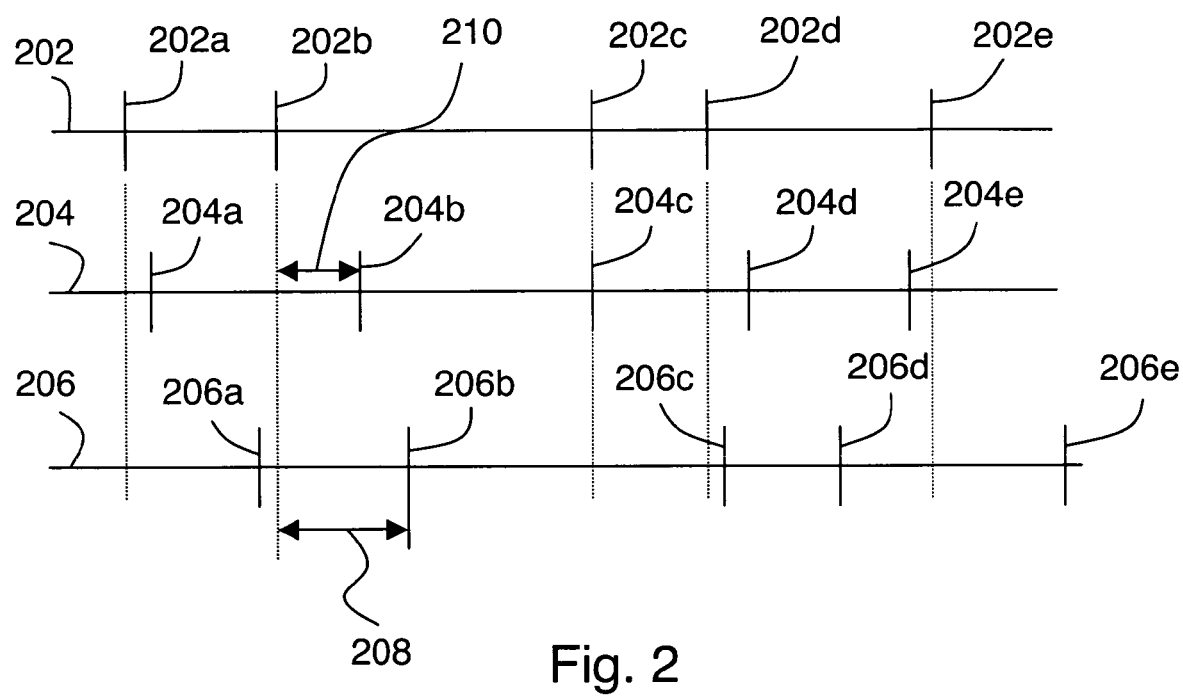
FIG. 2 shows relative timing of a stream 202, "currently playing" content information 204 for stream 202, and a buffered stream 206 obtained by time-delaying stream 202.

FIG. 2 shows relative timing of a stream 202, "currently playing" content information 204 for stream 202, and a buffered stream 206 obtained by time-delaying stream 202. In stream 202, track start times for several consecutive tracks are indicated as 202*a-e*. Times 204*a-e* are the times when content information 204 is updated to account for the playing of tracks beginning at times 202*a-e* respectively. As shown on FIG. 2, content information may be available immediately (e.g., 202*c* and 204*c*), or it may only become available after a track has started playing (e.g., 202*a,b,d* and 204*a,b,d*). Furthermore, this delay may vary from track to track as shown on FIG. 2. In some cases (e.g., 202*e* and 204*e*), content information may be available slightly before (e.g., less than 1 s) the corresponding track starts. In the context of FIG. 2, it is assumed that content information is available for currently playing tracks, possibly with a slight delay. Other embodiments of the invention can make use of content information on previously played tracks, and are discussed in connection with FIG. 3*a*.

Since stream 206 is a buffered copy of stream 202, it is the same as stream 202 except for a time delay 208. Thus 206*a-e* are delayed track start times corresponding to track start times 202*a-e* respectively. Time delay 208 is preferably larger than a maximum delay 210 between track start time and content information availability, since such buffering is sufficient to ensure recording an entire track in the presence of a slight delay in content information availability. In addition, it may require a non-negligible time Ts to switch from one stream to another. In such cases, the buffer time delay 208 is preferably greater than or equal to time delay 210 plus Ts, to enable recording of an entire track in the presence of both time delays.

Embodiments of the invention can operate in various modes. For example, either batch or triggered recording can be performed. In triggered recording, the recording of a segment from a selected media stream is responsive to an indication from content information that a track of interest is playing. In batch recording, a segment from a selected media stream is recorded without reference to the content information, and then content information for the recorded segment is used to determine if tracks of interest are present in the recorded segment. To clarify the difference between these two modes, FIGS. 3*a* and 3*b* show methods for batch and triggered recording, respectively, according to embodiments of the invention.

The first step in FIG. 3*a* (batch mode) is intermediate segment recording 302. Segment recording 302 can be to a either a volatile or a non volatile physical medium. For example, intermediate segment recording 302 can entail continuous recording of a steam for a long time (e.g., several hours) onto a magnetic disk drive, where the recorded segment is subsequently processed to locate, clip, finally record and label tracks of interest.

In this example, and throughout this description, "intermediate recording" and "final recording" are used in a broad sense. In particular, final recording can entail the transfer of information from one location to another location (e.g., in cases where intermediate recording is to a semiconductor memory, and final recording is to a magnetic disk drive). Final recording can also entail the rearrangement or relabeling of information already stored at one location. For example, if intermediate recording is to a magnetic disk drive, then final recording can entail manipulation of data already stored on the disk drive to transform recorded segments to recorded, clipped and labeled tracks.

To obtain content information for the recorded segment, a past play list can be automatically constructed 304 by monitoring "currently playing" content information during recording 302. Alternatively, a past play list can be obtained 306 after completion of recording 302. For example, the play list for a radio show may be made available (e.g., on the internet) by a broadcaster (or a third party) some time after completion of the show. Such a play list is suitable content information for a recorded segment including the radio show. Once content information for the recorded segment is available, this content information is compared with user track preferences to select 308 which tracks, if any, in the recorded segment should be recorded. Selecting 308 is preferably implemented in conventional computer software to maximize flexibility and capability and minimize cost. The selected tracks are then clipped 310 and finally recorded 312 as discussed above.

The first step in FIG. 3*b* (triggered mode) is monitoring 314 of content information. When a track of interest to the user is known to be playing based on the content information, triggered recording 316 of a segment of a stream including the track of interest occurs. As discussed in connection with FIGS. 1 and 2, buffering of media stream inputs is typically required to ensure recording the entire track of interest. Within the recorded segment, the track of interest is selected, based on content information and user track preferences, and then the selected track is clipped 318 and final recorded 312 as discussed above.

The batch mode of FIG. 3*a* is simpler than the triggered mode of FIG. 3*b*, mainly because buffering of media stream inputs typically is not required for batch mode recording and typically is required for triggered mode recording. However, triggered mode recording provides more flexibility to the user, and is especially advantageous for catching and recording tracks which are rarely broadcast. Thus either of these two modes may be preferred, depending on circumstances. In a multi-channel system, these two modes could be practiced simultaneously, where some channels of the system operate in batch mode and other channels operate in triggered mode.

In addition to batch and triggered recording modes, the invention can be practiced with either static stream selection or dynamic stream selection. In static stream selection, streams are selected based on user stream preferences. In dynamic stream selection, streams are selected based on user track preferences and content information. In a multi-channel system, these two modes could be practiced simultaneously, where some channels of the system operate with static stream selection and other channels operate with dynamic stream selection. FIGS. 4*a* and 4*b* show static and dynamic stream selection, respectively, according to embodiments of the invention.

FIG. 4*a* shows a method of an embodiment of the invention having static stream selection. In step 402, a stream is selected based on user stream preferences. Such user stream preferences can specify a station, and/or a listening schedule (i.e., which stations to listen to at which times). Furthermore, in a multi-channel system, user stream preferences can specify more than one station and/or more than one listening schedule to be simultaneously monitored. Once a stream (or streams) is selected in step 402, then automated selection and recording 404 of tracks from the selected stream(s) is performed as discussed above. Static stream selection is usually practiced with batch recording, but can also be practiced with triggered recording.

FIG. 4*b* shows a method of an embodiment of the invention having dynamic stream selection. In step 406, content information for several streams is monitored. In step 408, at least one stream is selected based on content information and user track preferences. For example, a channel may be abandoned or avoided for playing too many tracks which have already been recorded or, conversely, the system may detect a channel on which many previously unrecorded tracks of interest are being played and change to that channel. This kind of dynamic stream selection can be practiced in connection with batch recording. Alternatively, dynamic stream selection in connection with triggered recording can be practiced. For example, if user preferences indicate that songs by artist X are to be recorded, then a stream can be dynamically selected because it is currently playing a song by artist X that has not been previously recorded. Following step 408, automated selection and recording 404 of tracks from the selected stream (s) is performed as discussed above. Dynamic stream selection is usually practiced with triggered recording, but can also be practiced with batch recording.

The preceding description relates to methods of the invention, and also provides various implementation details. Processors programmed to implement methods of the invention are also embodiments of the invention. Such embodiments can be stand-alone "set-top" boxes, or can be general purpose computers (e.g., "living room PCs") running software implementing methods of the invention. Such processors can use any combination of hardware and/or software to implement methods of the invention. The invention can also be embodied as a set of computer instructions recorded onto a computer-readable medium (e.g., an optical or magnetic disk) for implementing methods of the invention.

The above detailed description is by way of example instead of limitation. Thus the invention can be practiced with various modifications to the above embodiments. For example, the above examples relate to audio media, but the invention is also applicable to video and audio/video media. Also, digital media is considered in the above examples, but the invention is applicable to both analog and digital media.

What is claimed is:

1. A method for automatically selecting, recording and labeling media tracks from a first broadcast media stream, the method comprising:
   a) providing user track preferences;
   b) receiving content information relating to said first broadcast media stream;
   c) intermediate recording a first segment of said first broadcast media stream;
   d) automatically selecting zero or more first tracks within said first segment in accordance with said content information and said track preferences;
   e) automatically clipping each of said selected first tracks in said first segment by determining track start and end times;
   f) automatically final recording each of said clipped first tracks to a recording medium; and
   g) automatically labeling each of said final recorded first tracks with a meaningful label derived from said content information;
   wherein said content information does not provide a schedule of tracks to be played in the future.

2. The method of claim 1 wherein said content information comprises information relating to a track currently playing on said broadcast media stream.

3. The method of claim 2, wherein said content information has a maximum time delay between a start time of a broadcast track and a time when information that said broadcast track is currently playing is available in said content information, and further comprising buffering said media stream for a duration greater than said maximum time delay.

4. The method of claim 1, wherein said content information comprises information relating to tracks previously played on said broadcast media stream.

5. The method of claim 1, wherein said first media stream comprises an audio media stream, a video media stream or an audio-video media stream.

6. The method of claim 1, further comprising automatically organizing said final recorded first tracks according to said meaningful labels.

7. The method of claim 1, further comprising constructing a library of said recorded first tracks by repeatedly performing said intermediate recording, said selecting, said clipping, said final recording and said labeling without user input other than said user track preferences.

8. The method of claim 1, further comprising selecting said first broadcast media stream from a plurality of broadcast media streams according to user stream preferences.

9. The method of claim 1, further comprising selecting said first broadcast media stream from a plurality of broadcast media streams according to said user track preferences and said content information.

10. The method of claim 9, further comprising buffering said first broadcast media stream for a time duration greater than a time required for said selecting said first broadcast media stream from a plurality of broadcast media streams.

11. The method of claim 1, wherein said intermediate recording is triggered by said content information combined with said user track preferences.

12. The method of claim 1, wherein said intermediate recording is performed independent of said user track preferences.

13. The method of claim 1, further comprising:
   h) intermediate recording a second segment of a second broadcast media stream;
   i) automatically selecting zero or more second tracks within said second segment in accordance with said content information and said track preferences;
   j) automatically clipping each of said selected second tracks in said second segment by determining track start and end times;
   k) automatically final recording each of said clipped second tracks to said recording medium; and
   l) automatically labeling each of said final recorded second tracks with a meaningful label derived from said content information;
   wherein said first and second recorded segments overlap in time, and wherein said content information also relates to said second broadcast media stream.

14. The method of claim 1, wherein said recording medium comprises a magnetic recording medium, an optical recording medium, or a nonvolatile semiconductor memory medium.

15. A processor programmed to implement a method for automatically selecting, recording and labeling media tracks from a broadcast media stream, the method comprising:
   a) providing user track preferences;
   b) receiving content information relating to said broadcast media stream;

c) intermediate recording a segment of said broadcast media stream;

d) automatically selecting zero or more tracks within said segment in accordance with said content information and said track preferences;

e) automatically clipping each of said selected tracks in said segment by determining track start and end times;

f) automatically final recording each of said clipped first tracks to a recording medium; and g) automatically labeling each of said final recorded tracks with a meaningful label derived from said content information;

wherein said content information does not provide a schedule of tracks to be played in the future.

16. The processor of claim 15 wherein said content information comprises information relating to a track currently playing on said broadcast media stream.

17. The processor of claim 15, wherein said content information comprises information relating to tracks previously played on said broadcast media stream.

18. The processor of claim 15, wherein said method further comprises automatically organizing said recorded tracks according to said meaningful labels.

19. The processor of claim 15, wherein said method further comprises constructing a library of said recorded tracks by repeatedly performing said intermediate recording, said selecting, said clipping, said final recording and said labeling without user input other than said user track preferences.

20. The processor of claim 15, wherein said intermediate recording is triggered by said content information combined with said user track preferences.

21. The processor of claim 15, wherein said intermediate recording is performed independent of said user track preferences.

22. A set of computer instructions recorded on a computer-readable medium for implementing a method for automatically selecting, recording and labeling media tracks from a broadcast media stream, the method comprising:

a) providing user track preferences;

b) receiving content information relating to said broadcast media stream;

c) intermediate recording a segment of said broadcast media stream;

d) automatically selecting zero or more first tracks within said segment in accordance with said content information and said track preferences;

e) automatically clipping each of said selected tracks in said segment by determining track start and end times;

f) automatically final recording each of said clipped first tracks to a recording medium; and g) automatically labeling each of said final recorded tracks with a meaningful label derived from said content information;

wherein said content information does not provide a schedule of tracks to be played in the future.

23. The set of computer instructions recorded on a computer-readable medium of claim 22, wherein said content information comprises information relating to a track currently playing on said broadcast media stream.

24. The set of computer instructions recorded on a computer-readable medium of claim 22, wherein said content information comprises information relating to tracks previously played on said broadcast media stream.

25. The set of computer instructions recorded on a computer-readable medium of claim 22, wherein said method further comprises automatically organizing said recorded tracks according to said meaningful labels.

26. The set of computer instructions recorded on a computer-readable medium of claim 22, wherein said method further comprises constructing a library of said recorded tracks by repeatedly performing said intermediate recording, said selecting, said clipping, said final recording and said labeling without user input other than said user track preferences.

27. The set of computer instructions recorded on a computer-readable medium of claim 22, wherein said intermediate recording is triggered by said content information combined with said user track preferences.

28. The set of computer instructions recorded on a computer-readable medium of claim 22, wherein said intermediate recording is performed independent of said user track preferences.

* * * * *